US009754437B2

(12) United States Patent
Deo et al.

(10) Patent No.: US 9,754,437 B2
(45) Date of Patent: Sep. 5, 2017

(54) AUTOMATED BEVERAGE FORMULATION

(75) Inventors: Indrani Deo, Ossining, NY (US); Steven Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 182 days.

(21) Appl. No.: 12/703,048

(22) Filed: Feb. 9, 2010

(65) Prior Publication Data

US 2011/0123688 A1 May 26, 2011

Related U.S. Application Data

(63) Continuation-in-part of application No. 12/625,226, filed on Nov. 24, 2009, now Pat. No. 8,335,592.

(51) Int. Cl.
*G06F 3/048* (2013.01)
*G07F 13/06* (2006.01)
(Continued)

(52) U.S. Cl.
CPC ......... *G07F 13/065* (2013.01); *B67D 1/0027* (2013.01); *B67D 1/0032* (2013.01); (Continued)

(58) Field of Classification Search
CPC .. B67D 1/0027; B67D 1/0032; B67D 1/0034; B67D 1/0888; B67D 1/1234; B67D 1/0041; G07F 13/065
See application file for complete search history.

(56) References Cited

U.S. PATENT DOCUMENTS

| | | | |
|---|---|---|---|
| 4,795,061 | A | 1/1989 | Peckjian |
| 5,103,649 | A | 4/1992 | Kieffer |

(Continued)

FOREIGN PATENT DOCUMENTS

| | | | |
|---|---|---|---|
| CA | 2492602 | A1 | 7/2006 |
| GB | 2442223 | A | 4/2008 |

(Continued)

OTHER PUBLICATIONS

International Search Report mailed Mar. 15, 2011 from International Application No. PCT/US2010/058072, 4 pages.

(Continued)

*Primary Examiner* — Shogo Sasaki
(74) *Attorney, Agent, or Firm* — Sterne, Kessler, Goldstein & Fox P.L.L.C.

(57) ABSTRACT

Systems and methods for dispensing beverages are provided. In accordance with various embodiments, beverage vendors may maintain the quality associated with a branded beverage while permitting consumers to enjoy the personalized beverages. In one embodiment, a user input may select a beverage formulation. The beverage formulation may be a commercially available branded beverage. A second user input may be received that is configured to modify a concentration of an ingredient of the selected beverage formulation. The ingredient may be a sweetener, such as a sugar. In response to the adjusting the ingredient, a concentration of at least one second ingredient may be automatically adjusted to form a recipe of a modified beverage formulation. In one embodiment, the user input adjusts a natural sugar and, in response, the carbon dioxide concentration is automatically adjusted. In another embodiment, carbon dioxide and another acid may be adjusted.

11 Claims, 6 Drawing Sheets

(51) Int. Cl.
*B67D 1/00* (2006.01)
*B67D 1/08* (2006.01)
*B67D 1/12* (2006.01)

(52) U.S. Cl.
CPC ......... *B67D 1/0034* (2013.01); *B67D 1/0041* (2013.01); *B67D 1/0888* (2013.01); *B67D 1/1234* (2013.01)

(56) References Cited

U.S. PATENT DOCUMENTS

| | | | |
|---|---|---|---|
| 5,139,708 | A | 8/1992 | Scott |
| 5,154,586 | A | 10/1992 | Rudick |
| 6,304,797 | B1 | 10/2001 | Shusterman |
| 6,591,664 | B2 | 7/2003 | Litton |
| 7,156,259 | B2 | 1/2007 | Bethuy |
| 7,295,889 | B2 | 11/2007 | Lahteenmaki |
| 7,762,181 | B2 | 7/2010 | Boland |
| 7,806,294 | B2 | 10/2010 | Gatipon |
| 8,335,592 | B2 | 12/2012 | Deo |
| 8,490,829 | B2 | 7/2013 | Deo |
| 2003/0173370 | A1 | 9/2003 | Park |
| 2004/0144423 | A1 | 7/2004 | Everett |
| 2005/0035152 | A1* | 2/2005 | Bethuy et al. ............ 222/129.2 |
| 2005/0048461 | A1 | 3/2005 | Lahteenmaki |
| 2005/0133420 | A1 | 6/2005 | Rinker et al. |
| 2005/0145650 | A1* | 7/2005 | Henry et al. .............. 222/129.1 |
| 2005/0199646 | A1 | 9/2005 | Moy |
| 2006/0097009 | A1 | 5/2006 | Bethuy |
| 2006/0099310 | A1 | 5/2006 | Koekkoek |
| 2006/0173260 | A1 | 8/2006 | Gaoni et al. |
| 2006/0231109 | A1 | 10/2006 | Howell et al. |
| 2007/0073557 | A1 | 3/2007 | Abramson |
| 2007/0093553 | A1 | 4/2007 | Baxter |
| 2007/0114244 | A1* | 5/2007 | Gatipon et al. ........... 222/129.1 |
| 2007/0205220 | A1 | 9/2007 | Rudick et al. |
| 2007/0205221 | A1 | 9/2007 | Carpenter |
| 2007/0212468 | A1* | 9/2007 | White et al. ................. 426/590 |
| 2008/0015494 | A1 | 1/2008 | Santini, Jr. et al. |
| 2009/0069932 | A1 | 3/2009 | Rudick |
| 2009/0069933 | A1 | 3/2009 | Rudick |
| 2009/0070234 | A1* | 3/2009 | Peters et al. .................... 705/27 |
| 2010/0163572 | A1 | 7/2010 | Downham |
| 2011/0123688 | A1 | 5/2011 | Deo |
| 2011/0125334 | A1 | 5/2011 | Deo |
| 2011/0192495 | A1 | 8/2011 | Deo |
| 2012/0046785 | A1 | 2/2012 | Deo |
| 2012/0285986 | A1 | 11/2012 | Irvin |
| 2013/0292407 | A1 | 11/2013 | Beavis |
| 2013/0328740 | A1 | 12/2013 | Blumberg, Jr. |

FOREIGN PATENT DOCUMENTS

| | | | |
|---|---|---|---|
| GB | 2465083 | A | 5/2010 |
| JP | 5120548 | A | 5/1993 |
| JP | 2005276148 | A | 10/2005 |
| JP | 2009245171 | A | 10/2009 |
| WO | 0225608 | A1 | 3/2002 |
| WO | 2004069179 | | 8/2004 |
| WO | 2007107704 | A1 | 9/2007 |

OTHER PUBLICATIONS

International Search Report mailed Mar. 14, 2011 from International Application No. PCT/US2010/058081, 4 pages.

International Search Report mailed Mar. 8, 2011 from International Application No. PCT/US2010/058085, 4 pages.

U.S. Appl. No. 12/625,226 Office Action dated Dec. 22, 2011.

* cited by examiner

AUTOMATED BEVERAGE FORMULATION

CROSS REFERENCE TO RELATED APPLICATIONS

This application is a continuation-in-part of U.S. patent application Ser. No. 12/625,226, filed Nov. 24, 2009, the disclosure of which is hereby incorporated by reference in its entirety.

BACKGROUND

Often, at restaurants or other locations such as a consumer's residence, a beverage may be created on-demand from a mixture of ingredients. An advantage of dispensing beverage in this form is that the concentrate containers and water supply typically occupy significant less space than is otherwise required to store the same volume of beverage in individual containers. Moreover, this dispensing equipment likewise eliminates increased waste formed by the empty individual containers as well as additional transport costs. These and other technological advances have allowed food and beverage vendors to offer more diverse choices to consumers.

Increasingly, beverage vendors are offering reduced or zero-calorie beverages, which are often marketed as "diet" beverages. The popularity of diet beverages, however, is likely hampered due to the replacement of sugar with artificial sweeteners. Furthermore, some consumers may like one brand of diet beverages flavored with a particular sweetener, yet like a second brand flavored with an entirely different sweetener. Thus, as vendors attempt to meet the personalized needs of their consumers they risk changing the very taste profile that the consumers enjoy, and/or increased costs manufacturing and transporting multiple variations of the same branded beverage. These predicaments, as well as others, are not limited to the cola industry. Rather, consumers of rehydration beverages, such as Gatorade® have also desired more diverse offerings, leading to products such as Propel® and G2®.

To meet the consumer's needs, one option may include allowing a user to adjust one or more ingredients, such as reducing natural sugars, however, doing so could have an adverse impact on the taste profile of the beverage, even if another sweetener is added by the consumer. Although the user themselves requested the modified product, they may be unsatisfied with the final product, including having to pay for a product they do not wish to consume. Such situations could result in unhappy consumers and/or lost revenue due to consumers dumping a product before paying for it, such as at a fountain machine. Improved systems and methods relating to the dispensing of beverages would be desirable.

SUMMARY OF THE INVENTION

Aspects of this disclosure relate to novel methods for dispensing a composition, such as a beverage. Certain aspects enable consumers to create personalized beverages that retain an acceptable taste profile. In accordance with various embodiments, beverage vendors may maintain the quality associated with a branded beverage while permitting consumers to enjoy the personalized beverages. Furthermore, drink vendors may reduce adverse environmental impacts caused by the manufacturing, transporting, and consumption of beverages.

In certain embodiments, one or more novel methods may be conducted with a computer-readable medium having computer-executable instructions that may be executed by a processor to perform the methods. In one embodiment, a computer-implemented method may receive a user input configured to select a beverage formulation. In one embodiment, the beverage formulation may be a commercially available branded beverage. For example, the beverage formulation may be a cola beverage that is commonly available in cans, bottles, and/or traditional fountain drink dispensers. In other embodiments, the beverage may be a hydration beverage, energy drink, juice, water, diary product, and combinations thereof. According to various aspects, one or more dispensing systems may be operatively connected to memory modules that store one or more recipes for the beverage formulation(s). The memory modules may be remotely located on a communication network.

Certain embodiments receive one or more user inputs at a beverage dispensing device to modify a concentration of an ingredient of a beverage formulation. The ingredient may be a sweetener, such as a sugar. Other ingredients may include: carbon dioxide, malic acid, citric acid, lactic acid, guanine, taurine, caffeine, coloring, and combinations thereof. Any ingredient within the recipe is within the scope of this disclosure. In response to the adjusting the ingredient, a concentration of at least one second ingredient may be automatically adjusted to form a recipe of a modified beverage formulation. In one embodiment, the user input adjusts a natural sugar and, in response, the carbon dioxide concentration is automatically adjusted. In another embodiment, carbon dioxide and another acid may be adjusted. In a further embodiment, an artificial sweetener may be adjusted. In certain embodiments, the automatically-adjusted ingredient was not present in the original recipe for the beverage formulation, however, is present in the recipe for the modified beverage formulation that was created by the automatic adjustment.

One or more beverage dispensing systems may be in operative communication with a display device. In certain embodiments, the display device may be a touch screen that may also serve as a user input device. Further methods, which may be implemented by dispensing systems disclosed herein, may determine if additional user inputs are received. For example, the system may determine if a user input has been received that requests the dispensing of a beverage according to a recipe of a beverage modified according to a consumer's adjustment of an ingredient, however, without the automatic adjustment of the least one second ingredient. For example, the modified recipe may be presented to a consumer for approval before dispensing it. Alternatively, a user input may be configured to adjust the concentration of an ingredient that was automatically adjusted.

One or more of the beverage formulation recipes may be stored on a computer-readable medium, either locally or remotely. For example, in one embodiment, the recipe of the modified beverage formulation may be stored. Further embodiments may store the recipe of the beverage that was dispensed by the beverage dispensing system. The storage of recipes of any beverage formulation, including unique formulations created by one or more consumers, is within the scope of this disclosure Certain devices and methods may be implemented to determine if a user input from a remote location is received. In one embodiment, multiple dispensing systems are connected to a communication network, such as the Internet or an intranet. In one embodiment, several dispensing systems may be connected to a central server. In one embodiment, several dispensing systems may be in direct communication with each other. In certain embodiments, a dispensing system may include a beverage dispensing head through which multiple beverage-forming liquids can be discharged. In certain embodiments, a dispensing system may simultaneously discharge a plurality of different ingredients, such as non-carbonated and carbonated water or different blends of flavorings, such as concentrates. In one embodiment, a dispensing system is configured to discharge several different beverages from a single nozzle. In certain embodiments, a dispensing system may supply beverages formed from combinations of one or more different liquids without having to extensively reconfigure the system's internal fluid supply lines and/or electronic circuitry.

DETAILED DESCRIPTION OF THE PREFERRED EMBODIMENT

Figure 1:
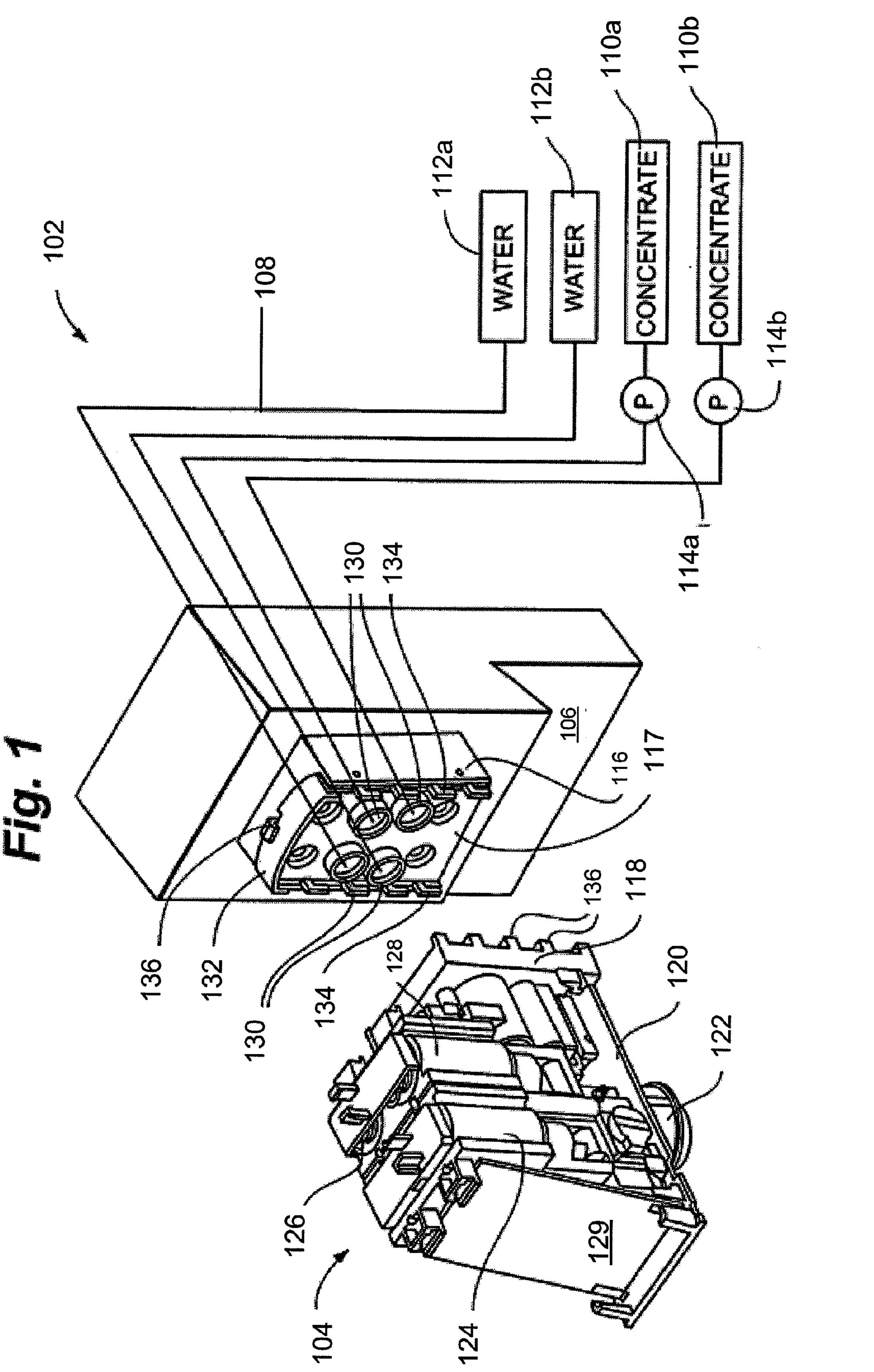
FIG. 1 is an exploded view and schematic diagram of an exemplary dispensing system and dispensing head in accordance with one embodiment of this invention.

FIG. 1 illustrates an exemplary dispensing system 102 that may be configured to dispense a beverage comprising a plurality of ingredients. While the exemplary dispensing system 102 will be described in the context of dispensing a beverage, those skilled in the art will appreciate that other compositions, such as medicaments, lotions, supplements, condiments, may be dispensed according to the teachings of this disclosure. Looking to FIG. 1, the exemplary dispensing system 102 includes a dispensing head 104, and a counter-located base 106, to which the dispensing head 104 may be removably mounted. Reservoirs 110*a* and 110*b* may store ingredients configured to be dispensed from dispensing system 102, such as flavored concentrates that may be in different forms, such as liquids (including syrups) or powders. Pumps 114*a* and 114*b* may be connected to reservoir 110*a* and 110*b*, respectively. The pumps 114*a* and 114*b* allow the movement of the associated ingredient through base 106 and into the dispensing head 104. A portion of the ingredients may comprise water (for example, see elements 112*a* and 112*b*). In one embodiment, one water source may supply a noncarbonated water stream. The second source may include a carbonator (not illustrated) that supplies carbon dioxide to the water stream it supplies through base 106 into the dispensing head 104. In another embodiment, the water source may be substantially devoid of carbonation. In yet other embodiments, a plurality of water sources may be configured to provide different levels of carbonated water.

The tubing 108 through which the four illustrated fluid streams flow into the base 106 may terminate at mounting block 116. As seen in FIG. 1, mounting block 116 may be removably mounted to the dispensing head 104. In the illustrative embodiments, mounting block 116 may have a front face 117 comprising passageways 130 to one or more reservoirs for one or more ingredients such as concentrate 110*a*/110*b* and/or water 112*a*/112*b*. The passageways 130 may be integrally formed with and extend from the block front face 116. The front face 116 and/or another portion of the mounting block 116 may further comprise a locking mechanism for aligning and ensuring proper fitting between the passageways 130 and the dispensing head 104.

The illustrated dispensing head 104 includes a vertical back plate 118 from which a base plate 120 extends horizontally. Back plate 118 may be removably coupled to dispensing unit mounting block 116 and a valve body 132 may be seated on the base plate 120. A nozzle assembly 122 is shown to extend below the base plate 120. Valve body 132 may comprise a plurality of conduits through which the ingredients flow into nozzle assembly 122. One or more valve units may be mounted to the valve body 132. For example, valve units 134 and/or 136 may regulate the flow of a separate one of the fluid streams through the dispensing head 104 and out of the nozzle assembly 122.

The dispensing system 102 may comprise one or more computer-readable mediums, such as circuit board 129. Circuit board 129 is shown mounted to the base plate 120 and may comprise the electrical components (not illustrated) that are used to regulate the actuation of pumps 114*a* and 114*b* and/or valve units 134, 136. Circuit board may also comprise computer-readable instructions that when executed by a processor, such as processor (such as processor 206, described in more detail below in relation to FIG. 2) to provide energization signals to valve units 134, 136, control signals to the pumps 114*a* and 114*b*, and/or feedback signals from the dispensing head 104 to the dispensing system 102.

Historically, electronic circuitry 129 (or another component comprising a computer-readable medium, comprised a "flavor chips." The flavor chip comprised computer-executable instructions, that when executed by a processor, would execute a method for mixing a predefined beverage. Unfortunately, past flavor chip technology had to be adapted to the mechanical properties of each dispenser and each flavored beverage required a separate flavor chip. Thus, in certain prior art systems, changing beverages to be dispensed from a dispenser would require the new flavors to be "mapped" onto the chip. For example, each parameter had to be adjusted to ensure the dispensed beverage received the intended proportions of ingredients. Aspects of the invention relate to systems and methods for dispensing custom beverages that do not require the inconvenience of mapping of different flavor chips for each possible combination of the various ingredients.

While FIG. 1 shows one exemplary dispensing system 102, those skilled in the art will readily appreciate that other systems that are either configured or able to be modified to dispense a multi-ingredient beverage according to one or more teachings of this disclosure are within the scope of the invention. Further exemplary systems, including exemplary heads and/or nozzles that may be selectively combined are disclosed in Assignee's U.S. patent application Ser. No. 10/412,681, BEVERAGE FORMING AND DISPENSING SYSTEM, filed Apr. 14, 2003, U.S. Patent Pub. No. 2004/0084475 A1, published May 6, 2004, and/or U.S. patent application Ser. No. 11/118,535, BEVERAGE DISPENSING SYSTEM WITH A HEAD CAPABLE OF DISPENSING PLURAL DIFFERENT BEVERAGES, filed Apr. 29, 2005, U.S. Pat. Pub. No. 2006/0097009, which are incorporated herein by reference in their entirety for any and all purposes.

Figure 2:
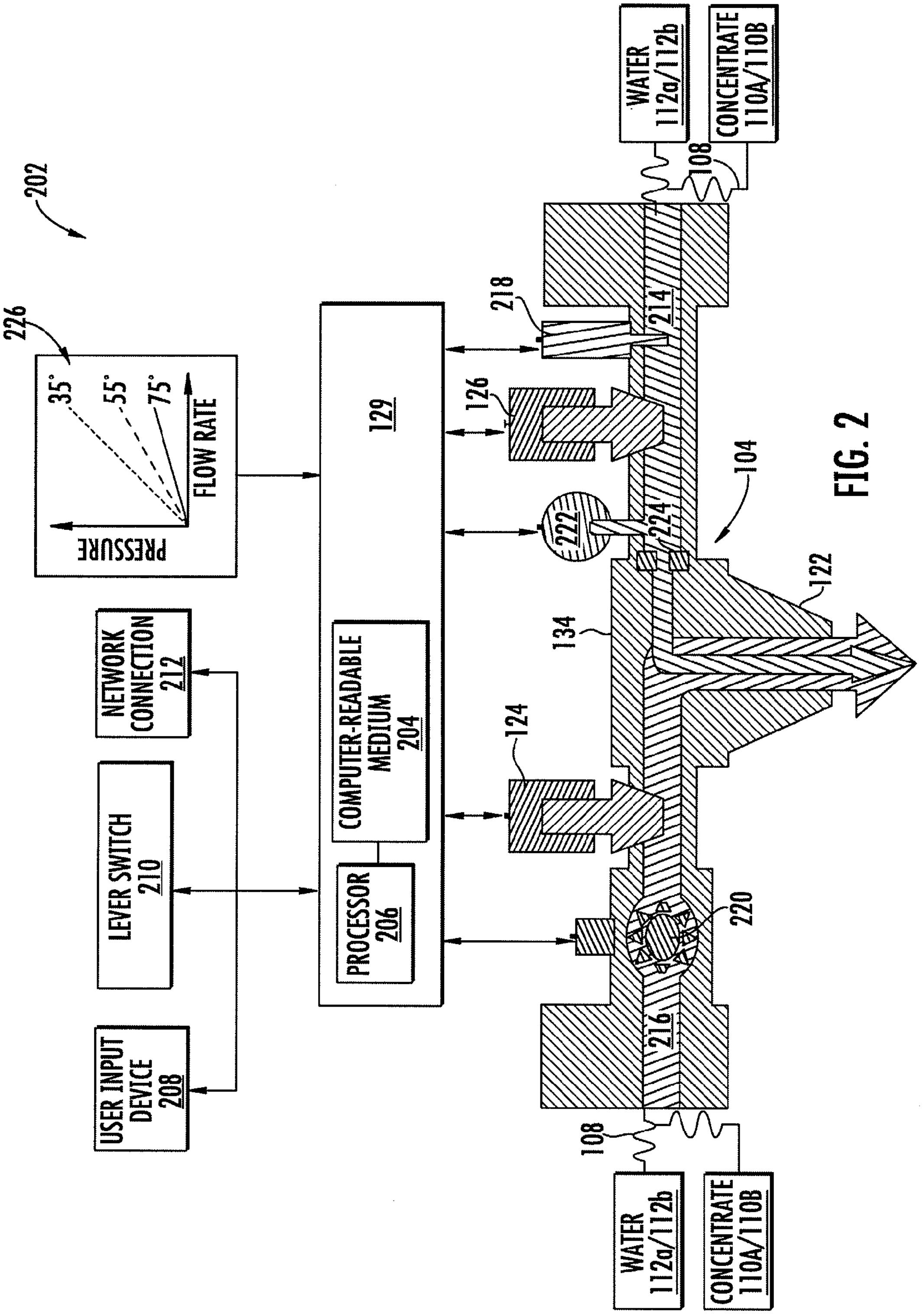
FIG. 2 shows an exemplary embodiment of one dispensing system in accordance with one embodiment of the invention.

FIG. 2 shows an exemplary dispensing system 202 that may be configured for use without prior art flavor chips to dispense custom beverages. Dispensing system 202 may be configured to implement novel methods, such as the methods shown in the flowchart of FIG. 3. In this regard, certain novel features of dispensing system 202 will be described in relation to the methods of FIG. 3, however, the novel apparatus shown in FIG. 2 is not limited to only these methods but are merely provided to demonstrate exemplary uses of dispensing system 202. As seen in FIG. 2, dispensing system 202 comprises an electronic circuitry 129, which may be identical or similar to electronic circuitry 129 shown in FIG. 1. Electronic circuitry 129 comprises a computer-readable medium 204 which may be magnetic, digital, optical, or any format configurable to comprise computer-executable instructions that may be executed by a processor, such as processor 206.

Processor 206 may be configured to execute instructions on the computer-readable medium, such as computer-readable medium 204, received from a user input device 208, lever switch 210 and/or a network connection 212. The user input device 208 may include any components or group of components (including a switch similar or identical to lever switch 210) that allows a user to provide an input to dispensing system 202, which may be mechanical, electrical, or electromechanical. Novel uses of user input device 208 may be implemented in accordance with one or more novel methods described herein. As one example, user input device 208 may be used in conjunction with step 302 shown in FIG. 3. At step 302, instructions may be received for dispensing a beverage. In one embodiment, user input device 208 may allow a user to instruct dispensing system 202 to dispense a specific beverage formula. In one embodiment, user input device 208 may comprise a touch screen that is in operative communication with electronic circuitry 129. The touch screen may be configured to display a plurality of beverage classes. For example, in one embodiment, the classes may include, but are not limited to: colas, diet colas, energy drinks, water, fruit juices and combinations of any of these groups. In certain embodiments, a user may be able to pick a beverage class from a group of classes. In various embodiments, the display of possible beverage for selection may be adjusted based upon the levels or presence of specific ingredients detected in dispensing system 202.

The touch screen may be configured to allow a user to first select a specific brand of beverage, such as a particular energy drink from a plurality of energy drinks. Still yet, the touch screen may allow a user to pick a specific commercially available beverage and further refine the ingredients to be dispensed to form a similar beverage. In one embodiment, the refined beverage has the same ingredients, however, comprises different proportions or amounts of the ingredients. For example, a user may first select the cola beverage "Pepsi," and then wish to adjust one or more parameters of the Pepsi to be dispensed. For example, the user may wish to adjust the sugar content and/or carbonation of the beverage to be dispensed. In another embodiment, the refined beverage has at least one different ingredient, for example; at least a portion of the high fructose corn syrup may be replaced with various levels of one or more ingredients.

While the exemplary embodiment was described in relation to a touch screen, other input devices may be used in combination with or in lieu of a touch screen. For example, a user may swipe a card having electronic information a sensor, such as for example, an optical, magnetic, or RFID sensor to provide a user input. In another embodiment, the user may utilize a biometric input to provide an input. Yet in other embodiments, the user may enter alphanumeric inputs using a keyboard. The lever switch 210 may also be operatively connected to electronic circuitry 129 to provide an input indicative that a receptacle is placed under the nozzle 122.

Network connection 212 may also provide one or more user inputs (as well as transmit outgoing signals) coupling dispensing system 202 to a communication network, such as a LAN or the Internet. The dispensing system 202 (and other devices) may be connected to a communication network via twisted pair wires, coaxial cable, fiber optics or other media. Alternatively, radio waves may be used to connect one or more beverage dispenser systems to the communication network. In one such embodiment, one or more dispensing systems may be in communication with each other and readily transmit and receive information regarding other dispenser systems, including a unique formula dispensed to a particular user. In one embodiment, a plurality of dispensing systems may each be coupled to each other through a central server. Yet in another embodiment, the dispensing systems may communication directly with each other. Thus, in one or more embodiments, electronic circuitry 129 may include computer-executable instructions for transmitting information to other dispensers and/or a server.

Figure 3:
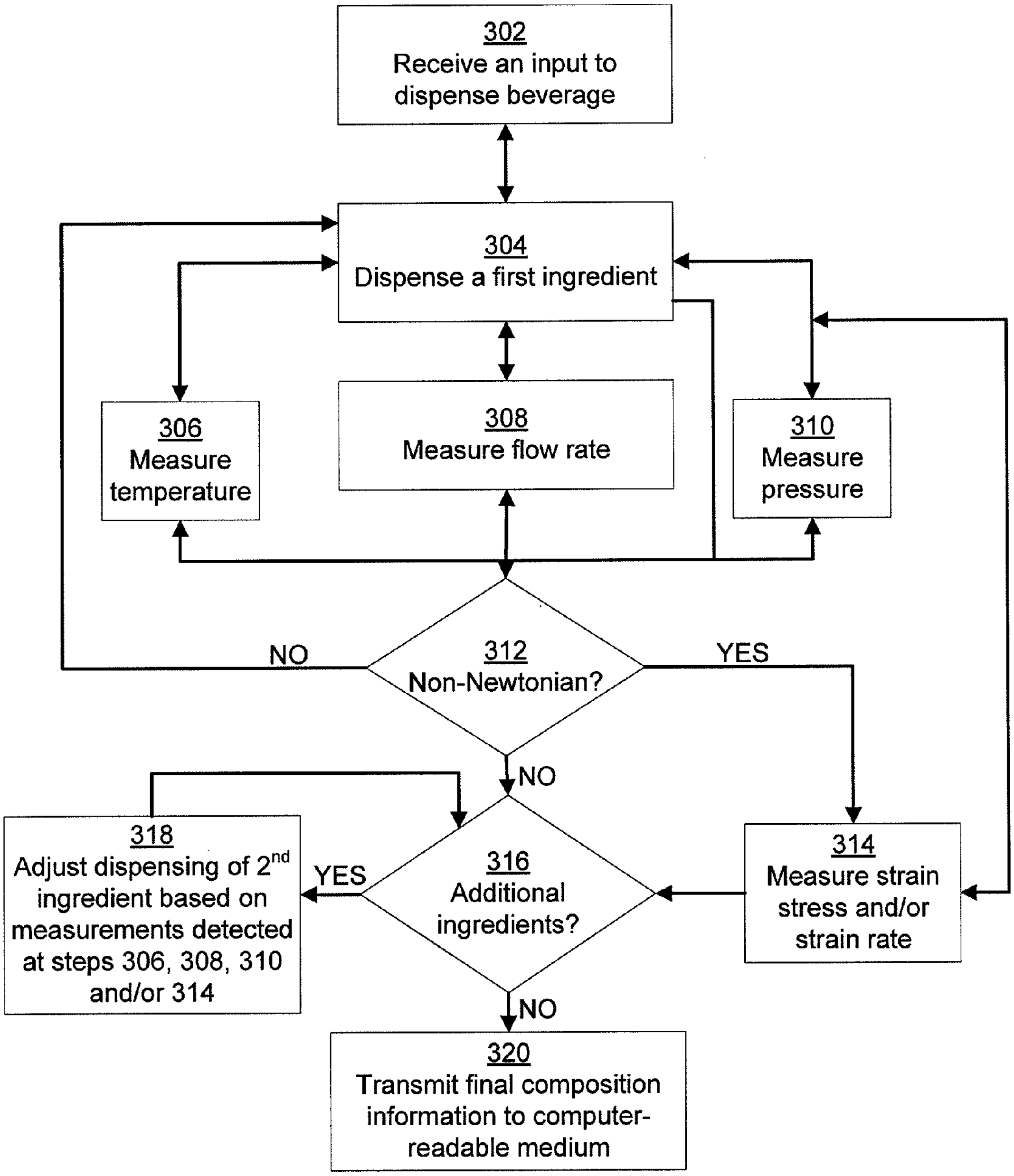
FIG. 3 is a flowchart of an exemplary method in accordance with one embodiment of the invention.

Step 304 of FIG. 3 may be implemented to dispense a first ingredient into a conduit of the dispensing system 202. Looking to the exemplary dispensing system 202 in FIG. 2, a first conduit, such as conduit 214 may also be connected (for example, through a series of valves and/or through tubing 108) to a beverage ingredient source (such, as for example concentrate(s) 110*a*/110*b*). During beverage preparation and dispensing, one or more ingredients, such as water 112*a*/112*b* and/or concentrates 110*a*/110*b* may pass through the first conduit 214. Conduit 214 is merely exemplary, as additional or fewer ingredient sources may be upstream or downstream from conduit 214. Moreover, dispensing system 202 may comprise a plurality of conduits, such as second conduit 216. The second conduit 216 may be in connection with one or more ingredient source, such as water 112*a*/112*b* and/or concentrates 110*a*/110*b*. In the illustrative dispensing system 202, the first conduit 214 and the second conduit 216 diverge at the nozzle 122, where ingredients may be mixed and dispensed from the dispensing system 202.

Regarding the nozzle 122, the illustrated dispensing system 202 of this invention may includes the single dispensing head 104 (shown in FIGS. 1 and 2) with plural passageways, such as conduits 214, 216 (shown in FIG. 2) through which concentrated ingredients may flow. Valve units 124, 126, and 128 may operate independently from each other and be independently controlled. Thus, the disclosed systems 102, 202 may be constructed so that a single dispensing head 104 may be used to discharge beverages blended from any one of two or more distinct ingredients (such as concentrates) to a single nozzle 122. In certain embodiments, this may eliminate the need to provide the system 102 with multiple dispensing heads wherein each head is employed to dispense a single beverage. Other embodiments, however, may implement a plurality or heads and/or nozzles. Regardless of the quantity of nozzles utilized, those skilled in the art will appreciate that valves 124 and 126 may be simultaneously opened to discharge a beverage that is a desirable mixed blend of two or more concentrates or other ingredients.

Dispensing head 104 may be further designed so that the passage of one or more ingredients comprising carbonated water is discharged has a tapered increase in cross-sectional area along its length as measured starting from the top to the bottom. That is, a conduit or passage within dispensing system may be narrow at the high pressure end and widens considerably, to as much as ten times its width at the low pressure end. Consequently, as the water and gas fluid stream flows through a tapered passage, the pressure of the gas bubbles in the stream may decrease continually but gradually. This gradual decrease in pressure reduces the extent the carbon dioxide, upon the discharge an outlet breaks out of the fluid stream. The reduction of carbonation breakout serves to ensure that the blended beverage has sufficient gaseous-state carbon dioxide to impart a desirable taste.

Conduits 214, 216 may comprise a plurality of sensors to measure one or more parameters of one or more ingredients that travel through the respective conduit 214, 216 to the nozzle 122. The measured parameters of a first ingredient may be used to adjust the amount or parameter of a second ingredient to be dispensed. Yet in other embodiments, the measured parameters of the first ingredient may be used to dispense the amount of that ingredient being dispensed. In certain embodiments, several parameters may be measured within conduit 214 and/or conduit 216. In one embodiment, steps 306, 308, and/or 310 may be implemented to measure the temperature, viscosity, pH, flow rate, and/or pressure of a first ingredient in the first conduit. In one embodiment, step 306 may comprise the implementation of temperature sensor 218 (shown in conduit 214), step 308 may include measurements with flow rate sensor 220 (shown in conduit 216) and step 310 may comprise measurements from PSI meter 222 (shown in conduit 214). While, the sensors are shown in two different conduits (214, 216), those skilled in the art will appreciate that both (and additional) conduits may have each of the above-described sensors as well as additional sensors.

Step 312 may also be implemented to determine if the ingredient (or one of the ingredients) is a non-Newtonian fluid. This determination may be based one or more measurements of steps 308-310 and/or based upon known information regarding the ingredient. For example, an electronic signal may be transmitted from the electronic circuitry 129 that is indicative that the ingredient(s) in at least one conduit 214, 216 is/are non-Newtonian. If at step 312, it is determined that the ingredient is non-Newtonian, step 314 may be implemented. At step 314, one or more sensors may detect or otherwise measure the shear stress and/or strain rate of the ingredient(s). In one embodiment, a first sensor in a first conduit 214 may be used to detect the flow rate of a first fluid; however, a second sensor in the same first conduct 214 may be used to detect the flow rate of a second fluid.

In those embodiments, where the ingredient is non-Newtonian, the shear stress could utilize sensors to first measure the gradient of for example, by using a first sensor to measure the gradient of the velocity profile at the walls of the conduit 214, 216. Computer-executable instructions on computer-readable medium 204 may use processor 206 to multiply the signal from the first sensor by the dynamic viscosity to provide the shear stress of that particular ingredient or combination of ingredients. In one embodiment, one or more micro-pillar shear-stress sensors may be used in conduit(s) 214, 216. The micro-pillar structures may be configured to flex in response to the drag forces in close proximity to the outer perimeter of the conduit(s) 214, 216 (i.e., the walls). The flexing may be detected electronically, mechanically, or optically. The result of the flexing may be received as an electronic signal by computer-executable instructions on computer-readable medium 204. Processor 206 may utilize the received electronic signal to determine wall-shear stress. As discussed above, one or more of the conduits 214, 216 may comprise a temperature sensor 218, which may transmit electronic signals as an input to electronic circuitry 129. The input from temperature sensor 218 may also be used in conjunction with one or more other sensors to determine the viscosity of an ingredient of composition comprising a plurality of ingredients.

Further aspects of the invention relate to novel uses of adjustable orifices. For example, in certain embodiments, rather than implement the volumetric measurement then dispensing of ingredients, adjustable orifices may be used to simultaneously measure and dispense ingredients. For example, as an ingredient (or compositions having a plurality of ingredients) flows through a conduit, flow meter 220 and temperature meter 218 may determine the viscosity of the ingredient. Based upon the parameters detected by meters 218 and 220, information may be received from the electronic circuitry 129 that adjusts, rather than merely opening or closing, an orifice (see, e.g., elements 126 and 224 within conduit 214 within the conduit 214, 216). In certain embodiments, this may result in a more homogeneous combination of the ingredients. In other embodiments, it may result in less wear and tear on the dispensing device 202. In yet further embodiments, it may result in more efficient measurements of ingredients. Obtaining accurate measurements of ingredients may be of special importance, for example, when dealing with micro-nutrients, such as nutrients that comprise less than about 5% of the entire beverage or composition. In certain embodiments, a first ingredient may be dispensed from dispensing system 202 or at about 6% of the final beverage.

In one embodiment, the flow rate of at least one ingredient may be adjusted by the same mechanism that measures the flow rate. For example, exemplary flow rate sensor 220 (shown in conduit 216 of FIG. 2) may comprise a turbine or a paddle meter that is configured to measure the flow rate of an ingredient within conduit 216 (this measurement may be conducted in cooperation with information received from one or more other sensors within dispensing device 202). Based upon the determination of the flow rate, electronic circuitry 129 may transmit a signal that causes a drag placed upon at least a portion of sensor 220 (such as a turbine or paddle portion) thus acting as a restrictive orifice, such that the quantity of ingredient that is dispensed through conduit over a predetermined period of time is reduced. Likewise, electronic circuitry 129 may transmit a signal that causes less drag placed upon at least a portion of sensor 220, (i.e., at least a turbine or paddle), thus acting to increase the quantity of ingredient that is dispensed through conduit over a predetermined period of time is reduced. This may occur during or before step 316, in which it is determined whether further ingredients are to be dispensed. In further embodiments, one or more parameters of any ingredient being dispensed may be adjusted based upon information received from one or more sensors (such as sensors 218 and/220). For example, the carbonation levels of the ingredient may be altered to adjust the viscosity of the ingredient being dispensed.

Further, in the preparation of certain compositions to be dispensed, it may not be desirable to dispense a first ingredient under the same pressure as a second ingredient (for example, when dispensing a second ingredient at step 318). In some instances, it may be desirable to reduce the pressure under which a first ingredient is dispensed, in yet other embodiments; it may desirable to increase the pressure that an ingredient is dispensed, for example, to ensure proper mixing or the intended profile of the beverage. In certain embodiments, adjustable orifices may be implemented to ensure the optimal flow rate is implemented for certain ingredients. For example, computer-readable instructions may be used to achieve the optimal combination of pressure and flow rate of an ingredient passing through a conduit 214, 216, such as by use of an adjustable orifice. A simplified graphical illustration is shown by way of element 226. As seen by element 226, adjusting an input, such as through a step motor (for example "35°", "55°", or "75°") may be used to obtain a preferred combination of flow rate and pressure. Those skilled in the art will readily appreciate that element 26 is merely illustrative and that other implementations, including the use of more than three adjustable settings, are within the scope of this disclosure.

At step 320, information regarding the dispensed beverage or composition may be stored on a computer-readable medium, such as computer-readable medium 204. The computer-readable medium of step 320 is not, however, required to be within or local to the dispensing system 202. Instead, the information regarding the dispensed beverage may be transmitted through network connection 212 to a remote computer-readable medium. In one embodiment, the unique composition dispensed through the implementation of one or more methods shown in FIG. 3 may be received at a second dispensing system, which may dispense the substantially the same beverage or composition.

Figure 4:
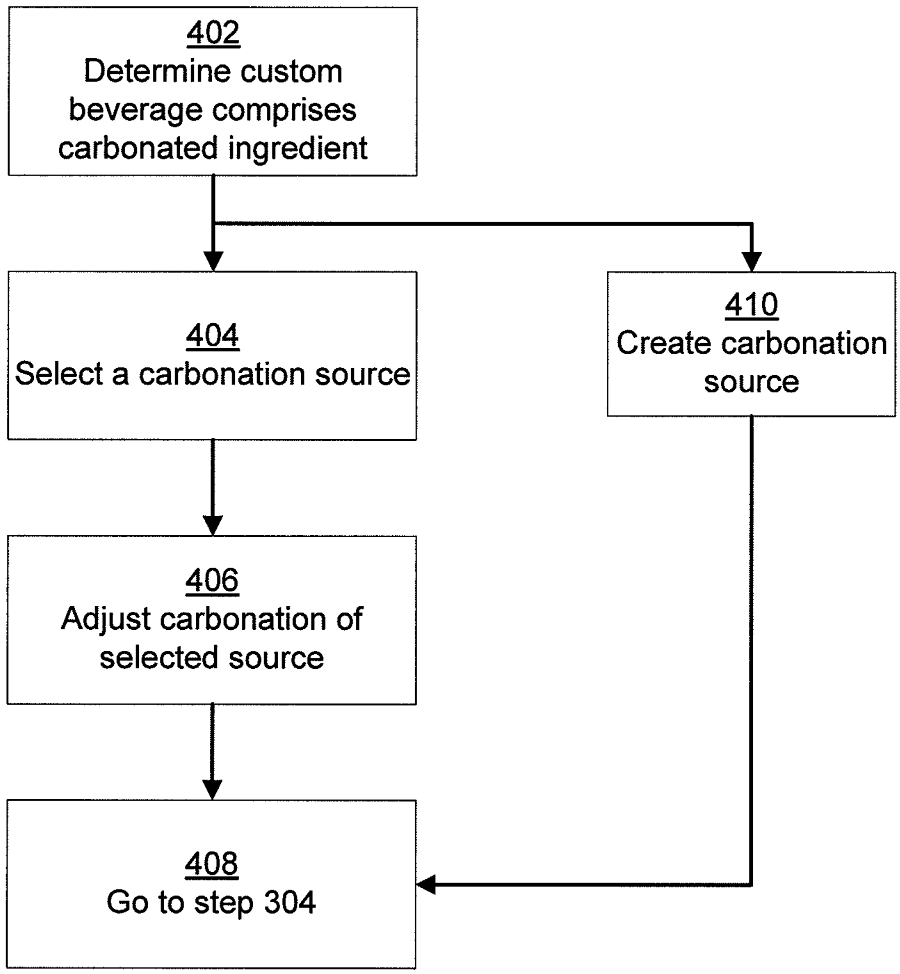
FIG. 4 is a flowchart of an exemplary method in accordance with one embodiment of the invention.

FIG. 4 shows a flowchart of an exemplary method in accordance with one embodiment of the invention. At step 402, it may be determined whether a custom beverage comprises a carbonated ingredient, such as carbonated water. In one embodiment, steps 404 and/or 406 may be performed to select a carbonation source (step 404) and adjust the carbonation of the selected source (step 406). For example, at step 404, it may be determined that the beverage requested contained carbonated water, however, the user requested that the beverage comprise less high fructose corn syrup, therefore the carbonation levels of the beverage may be reduced. Exemplary embodiments are disclosed later in this disclosure, for example, in reference to FIGS. 5-6. In one embodiment, the level of carbonation (or any gas) of a second ingredient is adjusted based upon electronic signals received from one or more signals regarding measurements from sensors measuring parameters of a first ingredient. Such parameters may be the flow rate, viscosity, pH, pressure, level of carbonation, level of constituents, such as sugar, water, coloring, etc., and/or any combination of these and other parameters that relate to the first ingredient.

In certain embodiments, the carbonation source selected in 404 may be one of a plurality of sources. For example, different sources may comprise various levels of carbonation; therefore, one source comprising the closest amount of carbonation needed may be selected before adjustment. In certain embodiments, dispensing system 102, 202 may selectively discharge streams of carbonized and non-carbonized water from separate containers, for example, reservoirs 112*a*-112*b*. Therefore, in certain implementations, the dispensing head 104 can be employed to dispense beverages selectively made from either carbonized or non-carbonized water. Alternatively, the dispensing head 104 may be used to dispense a beverage comprising carbonated water and non-carbonated water. In one embodiment, adjustable orifices are opened simultaneously to cause the simultaneous dispensing of both carbonated and non-carbonated water. This is useful when it is desired to blend these two liquids with a concentrate to produce a lightly carbonated beverage. In one embodiment, by varying the amount of time each orifice is open at one or more predetermined diameters, the extent to which the water supplied for the beverage may be set anywhere between fully carbonated (100% carbonated water supply) to no carbonation (100% non-carbonated water supply).

In yet other embodiments, step 410 may be used to create a carbonation source. In one embodiment, a first conduit such as conduit 214 may comprise water and conduit 216 may comprise carbon dioxide gas. Thus, based upon the sensors 218, 220, 222, and/or other sensors within conduits 214, 216 or elsewhere within dispensing system 202, the amount of water that is combined with the carbon dioxide gas is determined and dispensed, such as through an adjustable orifice. Regardless of whether steps 404 and 406 or step 410 is implemented, step 408 may be initiated. In one embodiment, the resultant carbonated ingredient may be dispensed into a conduit, such as conduits 214 and/or 216. (see, e.g., step 304 of FIG. 3).

It should further be appreciated that not embodiments have all of the above-described features and/or include each step and/or process of the disclosed methods. For example, certain embodiments may be provided with different quantities of fluid passageways and valve units than have been described above with respect to the illustrated embodiments. It is anticipated that these alternative embodiments of the invention may be used to provide a means for forming a beverage from a combination of a plurality of ingredients, which may be discharged from a either a plurality of nozzles or, alternatively, a single nozzle. Moreover, one or more nozzles may be configured to provide a discharge passage that extends vertically downward. Yet in other embodiments, one or more discharge passages for ingredients may have a spiral or helical configuration. While the exemplary dispensing system 102 shown in FIG. 1 may be used in a commercial setting, for example, a restaurant, those skilled in the art will readily appreciate that the teachings of this disclosure may be applied to any dispensing system, such as implemented in bar gun technology and/or residential use. Further, embodiments within the scope of this disclosure may be used with frozen beverages and/or non-carbonated beverages.

Further aspects of the invention relate to systems and methods that allow consumers to adjust one or more ingredients of a beverage formulation recipe. For example, consumers often enjoy beverages that, in addition to a base flavor, include a supplemental flavor, such as cherry or lemon-lime. Yet consumers are increasingly interested in adjusting one or more ingredients in their beverages, such as the amount of sugars, often in the form of high fructose corn syrup (HFCS). As companies attempt to expand to meet the personalized needs of their consumers they may risk changing the very taste profile that the consumer enjoys, and/or increased costs manufacturing and transporting multiple variations of the same branded beverage.

Figure 5:
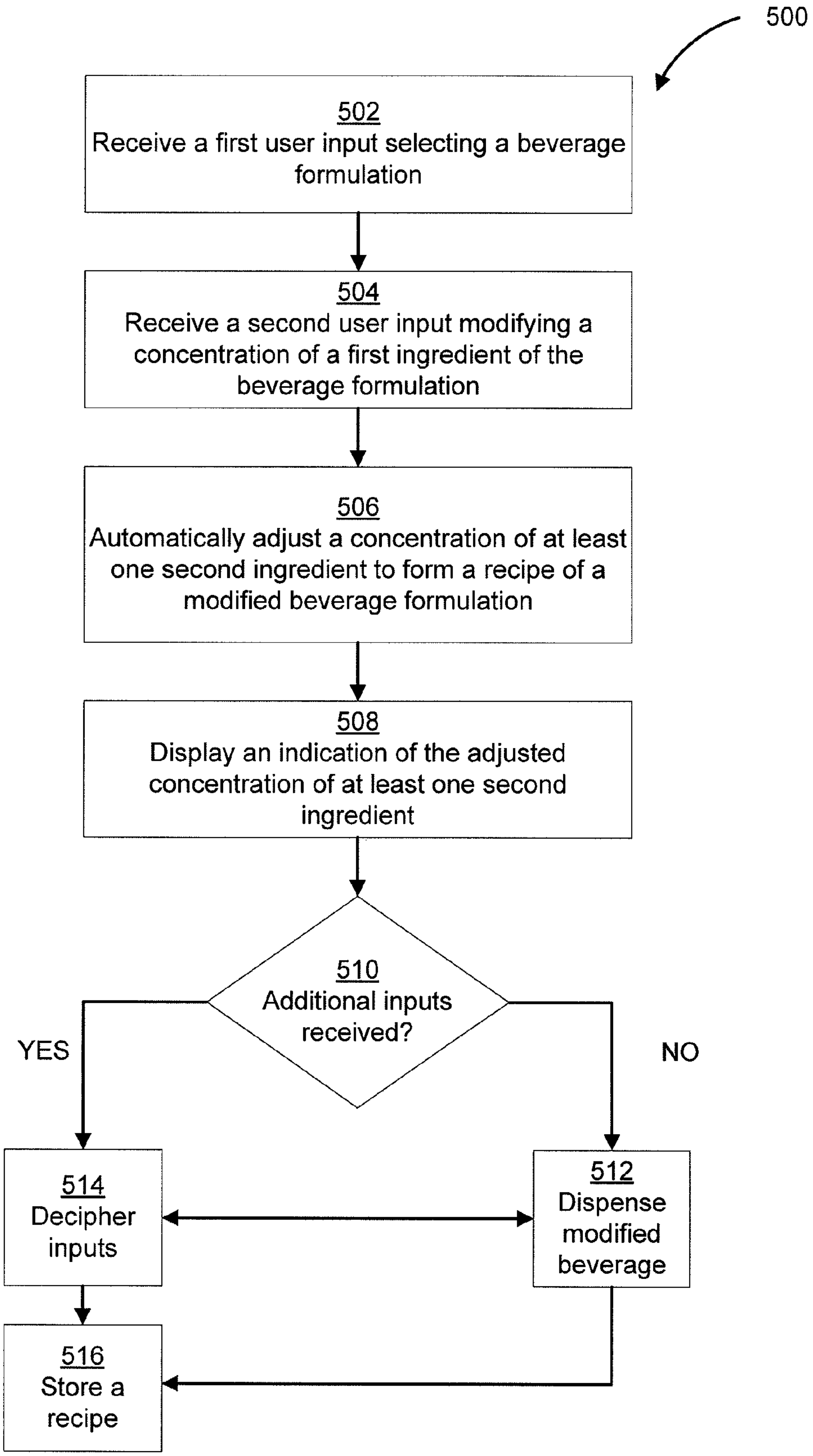
FIG. 5 is a flowchart of an exemplary method in accordance with one embodiment of the invention.

In certain embodiments, a consumer may adjust the amount (concentration) of one or more ingredients, such as a sweetener, of a beverage formulation. Based upon the consumer's adjustment, one or more additional ingredients may be automatically adjusted. FIG. 5 is a flowchart of an exemplary method 500 according to one embodiment of the invention. To provide the reader with a clear understanding of certain embodiments of the invention, exemplary methods will be described in relation to the exemplary beverage dispensing systems depicted in FIGS. 1 and 2, however, those skilled in the art with the benefit of this disclosure will readily appreciate that other dispensing apparatuses can perform (or may be modified to perform) the methods disclosed herein without undo experimentation. In accordance with one embodiment, a first user input may be received at a processor in communication with a memory storing one or more recipes of beverage formulations (see 302 of FIG. 3). In one embodiment, the first user input may be received at beverage dispensing system 102 and/or 202. The first user input may select a beverage formulation recipe from a plurality of beverage formulation recipes. For example, in one embodiment, user input device 208 (shown in FIG. 2) may allow a user to select a specific beverage formula. In one embodiment, user input device (such as input device 208) may comprise a touch screen that is in operative communication with electronic circuitry 129. Electronic circuitry 129 includes computer-readable medium 204 which may store one or more recipes for beverage formulations. As explained in more detail below, the recipes (either stored in medium 204 or another medium) may be modified beverage formulations created by one or more consumers.

A display device may be configured to display a plurality of beverage classes to a consumer. For example, a display device may be operatively connected to beverage dispensing system(s) 102 and/or 202. In other embodiments, the beverage dispensing system(s) 102 and/or 202 may be configured to transmit an electronic signal through network connection 212 to be received at a remote display device. In one embodiment, the remote display device may be operatively connected to a consumer's personal computer (PC), mobile device, including a mobile phone, or any electronic device.

Figure 6:
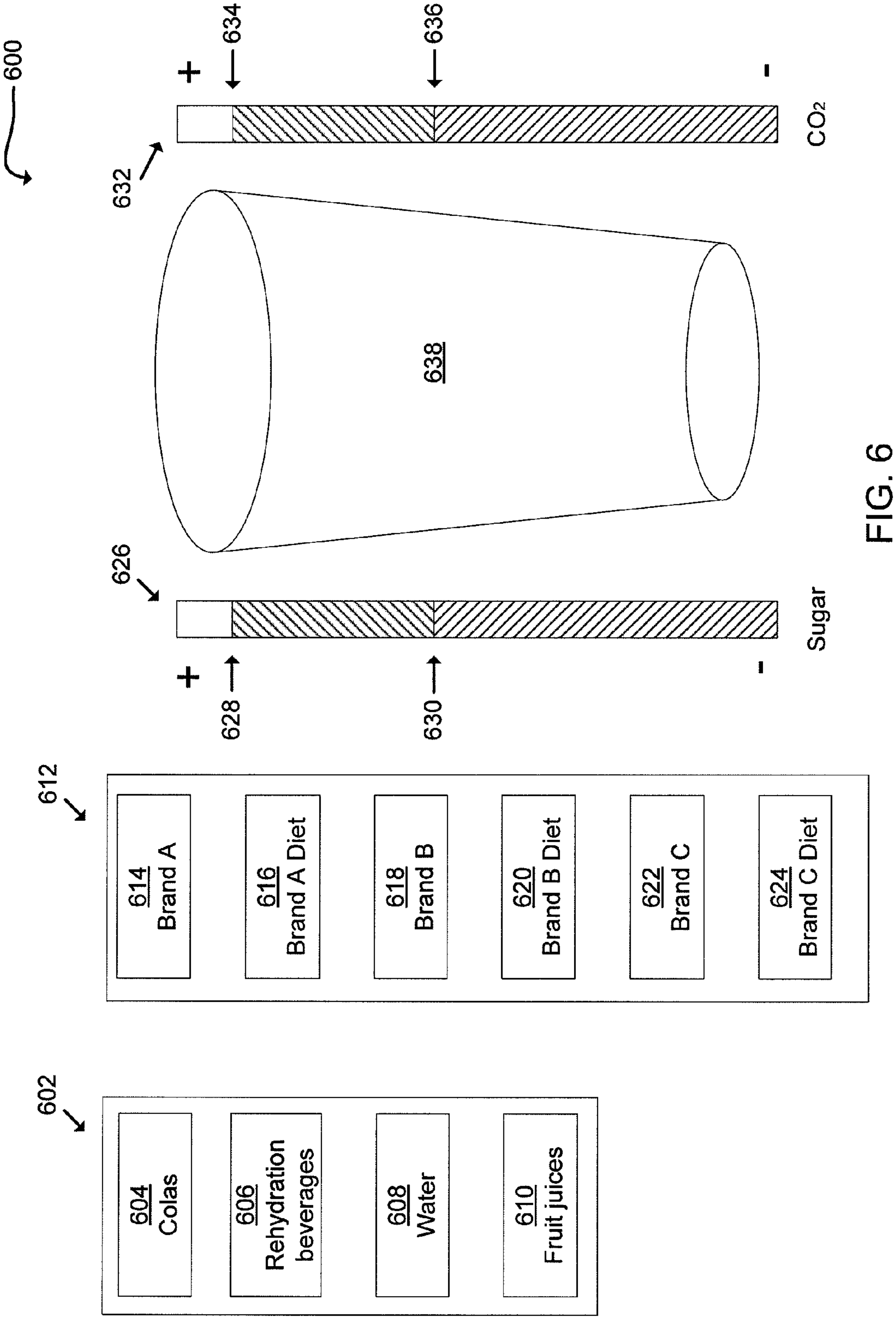
FIG. 6 is an exemplary graphical user interface in accordance with one embodiment of the invention.

FIG. 6 shows an exemplary graphical user interface 600 that may be generated from electronic signals transmitted in accordance to one or more embodiments of this disclosure. As seen in FIG. 6, a group of classes 602 may be displayed to the consumer. Exemplary classes of beverages 602 may include, but are not limited to: colas 604, rehydration beverages 606, water 608, and/or fruit juices 610. Those skilled in the art with the benefit of this disclosure will readily appreciate that these categories are merely exemplary and other categories may include one or more of the same beverage options. In certain embodiments, a consumer may be able to provide one or more user inputs that determine what beverages are grouped into one or more classes. In one embodiment, a consumer may explicitly select "favorite" classes and/or certain beverages that are grouped into a specific class. For example, a user may have a "morning" class to include beverages that include caffeine and/or a "workout" class that comprises rehydration beverages with various levels of carbohydrates that a user may select depending on the intensity of the workout.

In other embodiments, a computer-readable medium may determine one or more classes (or beverages displayed within a class) based upon the user's past purchasing or ordering decisions. Yet in other embodiments, one or more classes (or beverages) may be determined according to promotional considerations and/or upcoming events, such as holidays. In various embodiments, the display of possible beverage for selection may be adjusted based upon the levels or presence of specific ingredients detected in dispensing system 102/202. Further, actual logos and/or icons may be used in conjunction with or in lieu of any graphical configurations, including text. Those skilled in the art will also understand that non-interactive displays may also be used to display a graphical user interface, such as interface 600.

The user input received at 502 may be transmitted as a mechanical, electrical, or mechanical-electrical input. In one embodiment, a user input may be received through a local area network (LAN) and/or a wide area network (WAN), such as the Internet through a network connection, such as network connection 212 (shown in FIG. 2). Dispensing systems 102/202 (and other devices) may be connected to a communication network via twisted pair wires, coaxial cable, fiber optics or other media. Alternatively, radio waves may be used to connect one or more beverage dispenser systems to the communication network.

In one embodiment, a touch screen may be configured to allow a user to first select a specific brand of beverage, such as a particular juice from a plurality of fruit juices (e.g., from class 610). The selection of a specific brand of a beverage may follow a consumer selecting a class from a group of beverage classes. For example, the menu depicting the group of classes 602 may be replaced by another menu of different specific beverages within that class upon selection. In other embodiments, the menu depicting the group of classes 602 may remain at least partially visible. For example, a consumer may select class 604 which includes several colas. Upon selecting class 604, the user may be presented with a menu of several different "brands" of cola (see menu 612), such as "BRAND A" 614, "BRAND A Diet 616," which could represent Pepsi-Cola® and Diet Pepsi-Cola®, respectively. Other options may include "BRAND B" 618 and "BRAND B Diet" 620, which may in certain embodiments, represent Mountain Dew® and Diet Mountain Dew, respectively. Further options are provided as "BRAND C" 622 and "BRAND C Diet" 624.

In certain embodiments, a user input device, such as the touch screen may allow a user to pick a specific commercially available beverage and further refine the ingredients to be dispensed to form a similar beverage. For example, a processor in operative communication with a memory (such as computer-readable medium 204) may store a plurality of beverage formulation recipes. Thus, the first user input received at step 502 may select a one of the plurality of beverage options for further refinement before dispensing.

A second user input may be received at step 504. In certain embodiments, the second input is configured to modify a concentration of a first ingredient within the selected recipe. In one embodiment, the first ingredient may be a caloric sweetener. As discussed above, recent dietary concerns focus on reducing natural sugars, such as sucrose and/or high fructose corn syrup (HFCS). Thus, the second user input, may indicate that a consumer wishes to reduce the sugar content of the beverage formulation recipe. Yet in other embodiments, the user may wish to increase the natural sugars. For example, the consumer may have selected a diet beverage (i.e., the beverage formulation depicted by menu selection 616). Thus, the consumer may wish to adjust the flavor profile of the diet beverage to include a more natural sugar taste. In one embodiment, a display device may display an indication of the sugar level of the selected beverage formulation. For example, GUI 600 shows sugar level indicator 626 which may graphically shows the sugar level. The indication of the sugar(s) may be shown by different measurements. For example, in one embodiment, the total calories may be displayed to the user. In another embodiment, the weight of the ingredients (such as one or more sugars) may be displayed. In other embodiments, the volumetric measurement could be displayed. Still yet, the overall percentage of the ingredient could be displayed. In certain embodiments, the consumer may be able to selectively determine how the information is displayed. Furthermore, the displaying of the information may be done with objective values, such as using numerical measurements or estimates, or subjectively, such as color coding where "red" could suggest unhealthy levels, such as high sugar content, and "blue" could mean healthy levels, such as low sugar content. In certain embodiments, both objective and subjective measurements or estimates could be provided.

In certain embodiments, a consumer may adjust the sugar level indicator 626 to adjust the quantity (concentration) of sugar of the selected beverage formulation recipe. In embodiments comprising a touch screen as a user input device, a consumer may adjust the concentration by touching or sliding their finger or other device over a portion of the sugar level indicator 626. Other input devices may be used in combination with or in lieu of a touch screen. For example, a consumer may enter alphanumeric inputs and/or use arrow keys on a keypad. Other possible user input devices may allow a consumer to swipe a card having electronic information and/or provide information through use of an optical, magnetic, RFID, and/or biometric sensors. As discussed above, one or more user inputs may be received through a communication network, such as a LAN or the Internet.

At step 506, the concentration of at least one second ingredient may be automatically adjusted in response to the second user input to form a recipe of a modified beverage formulation. For example, merely adjusting one or more sugars in a cola beverage will not only reduce the flavors associated with those ingredients, but may drastically affect the impact of other ingredients which may have been masked by the sugars and/or react with the sugars (or any other ingredient). For example, reducing HFCS and/or sucrose in cola beverages may result in the consumer noticing an unpalatable taste from excessive carbonation from carbon dioxide, which provides carbonic acid. Thus, in one embodiment, the reduction of sugars at step 504 results in the automatic reduction of carbon dioxide in the recipe for the modified beverage formulation. In other embodiments, the carbon dioxide levels may be left unaltered; however, levels of other acids may be adjusted. For example, in one embodiment, citric acid levels may be adjusted based upon the consumer selecting the adjustment of the first ingredient, such as sugar. Those skilled in the art will realize that other acids, including but not limited to: lactic, malic, and other acids used in food and beverage applications may be adjusted within the scope of this disclosure. In one embodiment, one or more acids may be blended and/or stored with other ingredients, including but not limited to: caffeine, ginseng, guanine, and other acids or buffers.

Thus, certain embodiments of this disclosure permit the automatic adjustment of a non-sweetener ingredient based upon a consumer requesting the adjustment of a sweetener. In such embodiments, however, levels of a different sweetener ingredient may also be adjusted; however, it could be accompanied by an adjustment to a non-sweetener ingredient. Further embodiments, however, are directed towards automatically adjusting (increasing, decreasing, adding or removing) a concentration of an ingredient comprising a sweetener upon a consumer adjusting the concentration of another sweetener. For example, it is known that many sweeteners have various strengths of sweetness when compared to sugar. Further, as discussed above, the interaction of several different ingredients may provide a unique flavor profile that may have to be compensated for. In certain embodiments, the reduction of a sweetener may be (either partially or wholly) compensated with the addition of other sweeteners.

Exemplary sweeteners suitable for use in various embodiments of the beverages disclosed here include non-nutritive natural and artificial or synthetic sweeteners. Suitable non-nutritive sweeteners and combinations of such sweeteners may be selected for the desired nutritional characteristics, taste profile for the beverage, mouthfeel and other organoleptic factors. Non-nutritive sweeteners suitable for at least certain exemplary embodiments include, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. Alitame may be less desirable for caramel-containing beverages where it has been known to form a precipitate. In certain exemplary embodiments the beverage product employs aspartame as the sweetener, either alone or with other sweeteners. In certain other exemplary embodiments the sweetener comprises aspartame and acesulfame potassium. Other non-nutritive sweeteners suitable for at least certain exemplary embodiments include, for example, sorbitol, mannitol, xylitol, glycyrrhizin, D-tagatose, erythritol, meso-erythritol, malitol, maltose, lactose, fructo-oligosaccharides, Lo Han Guo juice concentrate, Lo Han Guo powder of mogroside V content from 2 to 99%, rebaudioside A, stevioside, other steviol glycosides, stevia rebaudiana extracts acesulfame, aspartame, other dipeptides, cyclamate, sucralose, saccharin, xylose, arabinose, isomalt, lactitol, maltitol, trehalose, and ribose, and protein sweeteners such as monatin, thaumatin, monellin, brazzein, L-alanine and glycine, related compounds, and mixtures of any of them. Lo Han Guo, steviol glycosides, e.g. rebaudiosides, steviosides and related compounds, as discussed further below, are natural non-nutritive potent sweeteners In one embodiment, flavor oils, such as lemon, lime, lemon-lime, orange, and combinations thereof may be suspended in an emulsion may be added, increased or decreased. In yet other embodiments, extracts dissolved in alcohol may be adjusted. Those skilled in the art with the benefit of this disclosure will appreciate that any food or beverage-safe sweetener may be used without departing from the scope of this disclosure. Thus, in certain embodiments, the reduction of sugars may result in the reduction of an acid source, such as carbon dioxide and the increase in another sweetener, such as flavor oil. In certain embodiments, the automatic adjustment allows the beverage producer to maintain quality over a branded beverage while allowing the consumer to reduce some or all of the attributes that the particular consumer may deem to be negative (i.e., high sugar content).

In certain embodiments, one or more adjusted ingredients that are present within the recipe of the modified formulation may not have present in the original beverage formulation. In one embodiment, the concentration of at least one second ingredient may comprise about 0% of the recipe for the beverage formulation and about greater than 0.5% of the recipe for the modified beverage formulation. Likewise, in other embodiments, the concentration of at least one second ingredient may comprise at least about 0.5% of the recipe for the beverage formulation and about 0% of the recipe for the modified beverage formulation.

At optional step 508, an indication of the adjusted concentration of one or more of the adjusted ingredients may be displayed to the user on a display device. Using FIG. 6 as an illustrative example, the visual depiction of the reduction of sugars from level marker 628 to level marker 630 on the sugar level indicator 626 may result in the depicted level of carbon dioxide shown in CO2 level indicator 632 to move from level marker 634 to level marker 636. In other embodiments, visual depictions of other altered ingredients may be presented. In one embodiment, a user may "cycle" through different ingredients and compare the amount of one or more ingredients of the modified beverage formulation against the amount of the same ingredient within the original beverage formulation.

Other visual indicia, such as indicia 638 may be modified in accordance with one or more received user inputs. For example, indicia 638 which could resemble a beverage container may be "filled" with a liquid representing the beverage to be dispensed. For example, if a user selects a cola beverage, the depicted beverage container may be "filled" with a brown colored liquid, whereas if the consumer selects a energy drink, the beverage container depicted by indicia 638 may be "filled" with a different color. Further, the graphical representation of the beverage may be adjusted as the consumer adjusts the ingredients. For example, if a consumer reduces the carbon dioxide to be dispensed into the beverage, the graphical indicia 638 may be adjusted to make it appear that fewer bubbles in the depicted carbonated beverage.

Step 510 may be implemented to determine if further user inputs are received. If no further user inputs are received, then step 512 may be implemented to dispense a serving of the modified beverage formulation. Alternatively, step 514 may decipher further user inputs. For example, a user input may be received to confirm the dispensing of the modified beverage formulation. In other embodiments, the consumer may not want the beverage formulated created by the automatic adjustment. Thus, in one embodiment, a user input may be received that requests the dispensing of a beverage according to a recipe of a beverage modified according to the consumer's requested alteration, however, without the automatic adjustment of the at least one second ingredient.

In yet other embodiments, the user may desire to review and/or revise the recommended concentrations that were automatically adjusted. For example, if an initial concentration of carbonation was at 100% and was reduced to about 60% during the automatic adjustment of step 506, the user may increase the carbonation (for example, to about 70%) or alternatively in the lower direction to further reduce the carbonation.

One or more of the beverage formulation recipes may be stored on a computer-readable medium, either locally or remotely. For example, in one embodiment, the recipe of the modified beverage formulation may be stored. In another embodiment, the recipe of the beverage that was ultimately dispensed may be stored. One or more dispensing systems 202 may be in communication with each other and readily transmit and receive information regarding other dispenser systems, including a unique formula dispensed to a particular user. In one embodiment, a plurality of dispensing systems may each be coupled to each other through a central server. Yet in another embodiment, the dispensing systems may communication directly with each other. Thus, in one or more embodiments, electronic circuitry 129 may include computer-executable instructions for transmitting information to other dispensers and/or a server.

We claim:

1. An apparatus comprising:
- a dispensing device;
- a user input device; and
- a processor in operative communication with a memory storing a plurality of beverage formulation recipes having a caloric sweetener,
- wherein the processor comprises a controller that is configured to:
  - adjust an amount of a sweetener in a beverage formulation in response to a user input on the user input device,
  - automatically adjust a concentration of carbon dioxide in the beverage formulation to form a modified beverage formulation by providing signals to the dispensing device,
  - display the automatically adjusted concentration of carbon dioxide, and
  - adjust the automatically adjusted concentration of carbon dioxide in response to a second user input to adjust carbon dioxide, and
- wherein the automatic adjustment of the concentration of carbon dioxide was not requested by the user.

2. The apparatus of claim 1, wherein the sweetener comprises a natural sugar.

3. The apparatus of claim 2, further comprising:
- a display device configured to display a representation of at least a portion of the plurality of beverage formulation recipes to a user.

4. The apparatus of claim 3, further comprising a non-transitory computer-readable medium having computer-executable instructions that when executed by a processor are configured to perform the method of:
- initiating dispensing the sweetener through a first conduit in the dispensing device;
- measuring a plurality of parameters of the sweetener being dispensed through the first conduit to obtain a result for each parameter; and
- based upon the result of at least one measured parameter of the sweetener, adjusting the concentration of carbon dioxide to be dispensed into either the first conduit or a second conduit in the dispensing device.

5. The apparatus of claim 4, the computer-executable instructions further comprising:
- measuring parameters of the concentration of carbon dioxide as it is dispensed; and
- based upon the measured parameters of the concentration of carbon dioxide, adjusting an amount of a third ingredient to be dispensed into either the first conduit or the second conduit.

6. The apparatus of claim 5, the computer-executable instructions further comprising:
- determining that the sweetener is a non-Newtonian fluid, and
- for the non-Newtonian fluid, detecting a measurement selected from the group consisting of: strain stress, strain rate, and combinations thereof as the non-Newtonian fluid is dispensed into a conduit.

7. The apparatus of claim 4, wherein the measured parameters of the sweetener are selected from the group consisting, of: flow rate, viscosity, pressure, pH, temperature, and combinations thereof.

8. The apparatus of claim 4, the computer-executable instructions further comprising:
- determining beverage selections to display on the display device; and
- displaying the beverage selections on the display device, wherein the user input corresponds to a selected beverage.

9. The apparatus of claim 8, wherein the determining beverage selections to display is based on past purchase decisions of a user.

10. The apparatus of claim 8, wherein the determining beverage selections to display is based on an amount of the sweetener and an amount of carbon dioxide available in the dispensing device.

11. The apparatus of claim 5, wherein the dispensing device includes an adjustable orifice to adjust a flow rate through the first conduit.

* * * * *